United States Patent
Lopez et al.

(10) Patent No.: US 10,133,512 B1
(45) Date of Patent: Nov. 20, 2018

(54) INCLUSION MONITORS

(71) Applicant: Friday Harbor LLC, New York, NY (US)

(72) Inventors: Ricardo Jorge Lopez, San Marcos, CA (US); Robert N. Hilton, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 0 days.

(21) Appl. No.: 15/499,773

(22) Filed: Apr. 27, 2017

(51) Int. Cl.
*G06F 3/06* (2006.01)
*G06F 15/78* (2006.01)

(52) U.S. Cl.
CPC ............ *G06F 3/0653* (2013.01); *G06F 3/065* (2013.01); *G06F 3/0619* (2013.01); *G06F 3/0683* (2013.01); *G06F 15/7807* (2013.01)

(58) Field of Classification Search
CPC ...... G06F 3/0653; G06F 3/0619; G06F 3/065; G06F 15/7807
See application file for complete search history.

(56) References Cited

U.S. PATENT DOCUMENTS

2007/0124728 A1* 5/2007 Rosenbluth ............. G06F 9/526 718/100
2010/0042771 A1* 2/2010 Kawaguchi ......... G06F 12/0808 711/5

* cited by examiner

*Primary Examiner* — Reginald G Bragdon
*Assistant Examiner* — Edward Wang
(74) *Attorney, Agent, or Firm* — Sheppard Mullin Richter & Hampton LLP

(57) ABSTRACT

Systems, devices, and techniques for processor synchronization are described. A described system includes sending, from first processors, release requests to an inclusion monitor, the release requests including an identifier tag; sending, from a second processor, an acquire request to the inclusion monitor circuitry, the acquire request including a weight value and the identifier tag; creating a content addressable memory (CAM) entry based on a receipt of at least one of the release or acquire requests; maintaining a count of the release requests that correspond to the identifier tag by using the entry's arrival counter; causing the first processors to stall if the entry's arrival counter does not satisfy a threshold criterion specified by the entry's weight value or if the acquire request has not been received; storing the acquire request's weight value as the entry's weight value; and releasing the first processors if the entry's arrival counter satisfies the criterion.

20 Claims, 7 Drawing Sheets

INCLUSION MONITORS

FIELD OF THE DISCLOSURE

The systems, methods, and apparatuses described herein relate to processor synchronization.

BACKGROUND

In some multiprocessor systems, processors in a group can coordinate their operational sequences. One such sequence, for example, is referred to as a join. A join, in some implementations, is a process where several execution threads on respective processors are required to deliver their results to a serialized execution sequence, which can proceed only when all of the threads have completed. In some implementations, processors in a group employ a barrier operation that ensures that such processors reach a common synchronization point before proceeding. Processors can use specialized barrier instructions to control barrier operation.

SUMMARY

Systems and techniques for processor synchronization are disclosed. In one aspect of the disclosed technologies, a system includes inclusion monitor circuitry; a content addressable memory (CAM) coupled with the inclusion monitor circuitry; a first processor configured to send a first release request to the inclusion monitor circuitry, the first release request including an identifier tag; a second processor configured to send a second release request to the inclusion monitor circuitry, the second release request including the identifier tag; and a third processor configured to send an acquire request to the inclusion monitor circuitry, the acquire request including the identifier tag and a weight value.

The inclusion monitor circuitry can be configured to create a CAM entry in the CAM based on receiving the first release request, the second release request, or the acquire request, and use the identifier tag as a tag of the CAM entry. The inclusion monitor circuitry, in response to receiving the first release request, can be configured to perform a first lookup in the CAM based on the identifier tag of the first release request, increment an arrival counter of the CAM entry, and cause the first processor to enter a stalled state based on a first determination that the arrival counter of the CAM entry does not satisfy a threshold criterion specified by a weight value of the CAM entry or a first determination that the acquire request has not yet been received by the inclusion monitor circuitry. The inclusion monitor circuitry, in response to receiving the second release request, can be configured to perform a second lookup in the CAM based on the identifier tag of the second release request, increment the arrival counter of the CAM entry, and cause the second processor to enter the stalled state based on a second determination that the arrival counter of the CAM entry does not satisfy the threshold criterion specified by the weight value of the CAM entry or a second determination that the acquire request has not yet been received by the inclusion monitor circuitry. In response to receiving the acquire request, the inclusion monitor circuitry can be configured to perform a third lookup in the CAM based on the identifier tag of the acquire request, store the weight value of the acquire request as the weight value of the CAM entry, and release the first processor and the second processor from the stalled state based on a determination that the arrival counter of the CAM entry does satisfy the threshold criterion.

These and other implementations can include one or more of the following features. In some implementations, the inclusion monitor circuitry is configured to invalidate the CAM entry based on the determination that the arrival counter of the CAM entry does satisfy the threshold criterion. In some implementations, the third processor is configured to send an additional acquire request to the inclusion monitor circuitry, the additional acquire request comprising the identifier tag, and wherein the inclusion monitor circuitry is configured to perform an additional lookup in the CAM based on a receipt of the additional acquire request and create a new CAM entry in the CAM based on the additional lookup missing in the CAM. In some implementations, the first determination that the arrival counter of the CAM entry does not satisfy the threshold criterion specified by the weight value of the CAM entry comprises a determination that the weight value of the CAM entry is greater than zero, and a determination that the arrival counter is less than the weight value of the CAM entry. In some implementations, the inclusion monitor circuitry is configured to store a processor identifier of the first processor in a register of the CAM entry. In some implementations, the inclusion monitor circuitry is configured to release the first processor from the stalled state by sending a command to the first processor. In some implementations, the command is addressed based on the processor identifier stored in the register in the CAM entry. In some implementations, the inclusion monitor circuitry, the CAM, and the processors are formed within a system-on-a-chip. In some implementations, the first processor includes the third processor.

In another aspect, a technique for processor synchronization includes sending, from first processors, release requests to inclusion monitor circuitry, the release requests including an identifier tag; sending, from a second processor, an acquire request to the inclusion monitor circuitry, the acquire request including a weight value and the identifier tag; creating, in a CAM by the inclusion monitor circuitry, a CAM entry based on a receipt of at least one of the release requests or the acquire request, where creating the CAM entry includes using the identifier tag as a tag of the CAM entry; maintaining a count of the release requests that correspond to the identifier tag by using an arrival counter of the CAM entry; causing the first processors to enter a stalled state based on a determination that the arrival counter of the CAM entry does not satisfy a threshold criterion specified by a weight value of the CAM entry or a determination that the acquire request has not yet been received by the inclusion monitor circuitry; storing the weight value of the acquire request as the weight value of the CAM entry; and releasing the first processors from the stalled state based on a determination that the arrival counter of the CAM entry does satisfy the threshold criterion.

These and other implementations can include one or more of the following features. Implementations can include operating the inclusion monitor circuitry to invalidate the CAM entry based on the determination that the arrival counter of the CAM entry does satisfy the threshold criterion. In some implementations, the determination that the arrival counter of the CAM entry does not satisfy the threshold criterion specified by the weight value of the CAM entry includes a determination that the weight value of the CAM entry is greater than zero, and a determination that the arrival counter is less than the weight value of the CAM entry. Implementations can include storing processor identifiers of the first processors by using a register of the CAM entry. Implementations can include tracking processor identifiers of the first processors by using a register of the CAM entry.

Releasing the first processors from the stalled state can include sending commands to the first processors. In some implementations, the commands are addressed based on the processor identifiers stored in the register in the CAM entry. Implementations can include operating the second processor to send an additional acquire request to the inclusion monitor circuitry, the additional acquire request comprising the identifier tag; performing an additional lookup in the CAM based on a receipt of the additional acquire request by the inclusion monitor circuitry; and creating a new CAM entry in the CAM based on the additional lookup missing in the CAM. In some implementations, the inclusion monitor circuitry, the CAM, and the processors are formed within a system-on-a-chip. In some implementations, the first processors include the second processor.

In another aspect, a system for processor synchronization can include an inclusion monitor circuitry including a controller and a CAM configured to store a plurality of CAM entries; and processors to perform synchronization via the inclusion monitor circuitry using an identifier tag, wherein first processors of the processors are configured to respectively send release requests to the controller, the release requests comprising the identifier tag, wherein a second processor of the processors is configured to send an acquire request to the controller, the acquire request comprising a weight value and the identifier tag, wherein the controller is configured to mark a CAM entry of the CAM entries as valid based on receiving at least one of the release requests or the acquire request, and write the identifier tag of the at least one of the release requests or the acquire request as a tag of the CAM entry, wherein the controller is configured to perform first lookups in the CAM based on the identifier tag of the release requests, maintain a count of the release requests that correspond to the identifier tag by using an arrival counter of the CAM entry, and cause the first processors to enter a stalled state based on a determination that the arrival counter of the CAM entry does not satisfy a threshold criterion specified by a weight value of the CAM entry or a determination that the acquire request has not yet been received by the controller, and wherein the controller is configured to perform a second lookup in the CAM based on the identifier tag of the acquire request, store the weight value of the acquire request as the weight value of the CAM entry, and release the first processors from the stalled state based on a determination that the arrival counter of the CAM entry does satisfy the threshold criterion.

These and other implementations can include one or more of the following features. In some implementations, the inclusion monitor circuitry is configured to invalidate the CAM entry based on the determination that the arrival counter of the CAM entry does satisfy the threshold criterion. In some implementations, the determination that the arrival counter of the CAM entry does not satisfy the threshold criterion specified by the weight value of the CAM entry includes a determination that the weight value of the CAM entry is greater than zero, and a determination that the arrival counter is less than the weight value of the CAM entry. In some implementations, the inclusion monitor circuitry is configured to store processor identifiers of the first processors in a register of the CAM entry, and wherein the inclusion monitor circuitry is configured to release the first processors from the stalled state by sending commands to the first processors. In some implementations, the commands are addressed based on the processor identifiers stored in the register in the CAM entry. In some implementations, the inclusion monitor circuitry, the CAM, and the processors are formed within a system-on-a-chip. In some implementations, the first processors include the second processor.

In some implementations, the second processor is configured to send an additional acquire request to the inclusion monitor circuitry, the additional acquire request comprising the identifier tag. In some implementations, the inclusion monitor circuitry is configured to perform a third lookup in the CAM based on a receipt of the additional acquire request and cause the second processor to enter a stalled state based on a determination that the CAM entry is valid. In some implementations, the inclusion monitor circuitry is configured to store a processor identifier of the second processor by using a register of the CAM entry. In some implementations, the inclusion monitor circuitry is configured to release the second processor from the stalled state by sending a command. In some implementations, the command is addressed based on the processor identifier stored in the register in the CAM entry.

Particular aspects of the disclosed technologies can be implemented so as to realize one or more of the following potential advantages. A described technology may increase the speed and flexibility of hardware implemented synchronization techniques. A described technology may enable multiple inclusion tags to be in use at any given time. A described technology can provide a hardware inclusion interface that improves code efficiency and enables inclusion groups to be formed dynamically.

Details of one or more implementations of the disclosed technologies are set forth in the accompanying drawings and the description below. Other features, aspects, descriptions and potential advantages will become apparent from the description, the drawings, and the claims.

DETAILED DESCRIPTION

A computing system can employ a hardware based inclusion monitor to provide processor synchronization such as barrier synchronization. An inclusion monitor can hold one or more joining processors in a stalled state until several other worker processors have joined the inclusion, e.g., the processors are arriving at a rendezvous. The inclusion monitor can hold all worker processors at the rendezvous until all members of the inclusion have arrived.

It may be difficult to anticipate the number of concurrent parallel worker threads or joining threads that may be employed by a parallel algorithm or a highly concurrent distributed processing application. If the number of separate barriers or threads supported by hardware does not meet the needs of the application, performance may be curtailed.

A hardware based inclusion monitor, as described herein, can use a content addressable memory (CAM) to provide a scalable inclusion protocol with an inversion capability that provides a turnstile protocol to a computing system. The system's inclusion monitor supports a barrier protocol and provides a configurable number of barriers allowing applications to efficiently scale in highly distributed environments. The inclusion monitor utilizes a CAM for naming barriers. For example, a CAM can store multiple entries at any given time that correspond to different named barriers in use within the system. The base inclusion protocol can be supported, where a barrier is established and a rendezvous is set. All members of the inclusion can be prohibited from leaving the rendezvous until all members have arrived.

The inclusion protocol inversion occurs when a gatekeeper processor acquires an inclusion that does not yet exist. A passing processor releases the barrier. The passing processor can only proceed if the named barrier has already been established by the gatekeeper processor. This effects a turnstile controlled by the gatekeeper. Utilizing the inclusion monitor in this fashion can synchronize the gatekeeper with prospective passing processors. Further, in some implementations, the gatekeeper cannot add additional tokens to the turnstile (e.g., add additional weights) until the barrier has been released by all the passing processors, e.g., all the tokens at the turnstile have been consumed.

Figure 1:
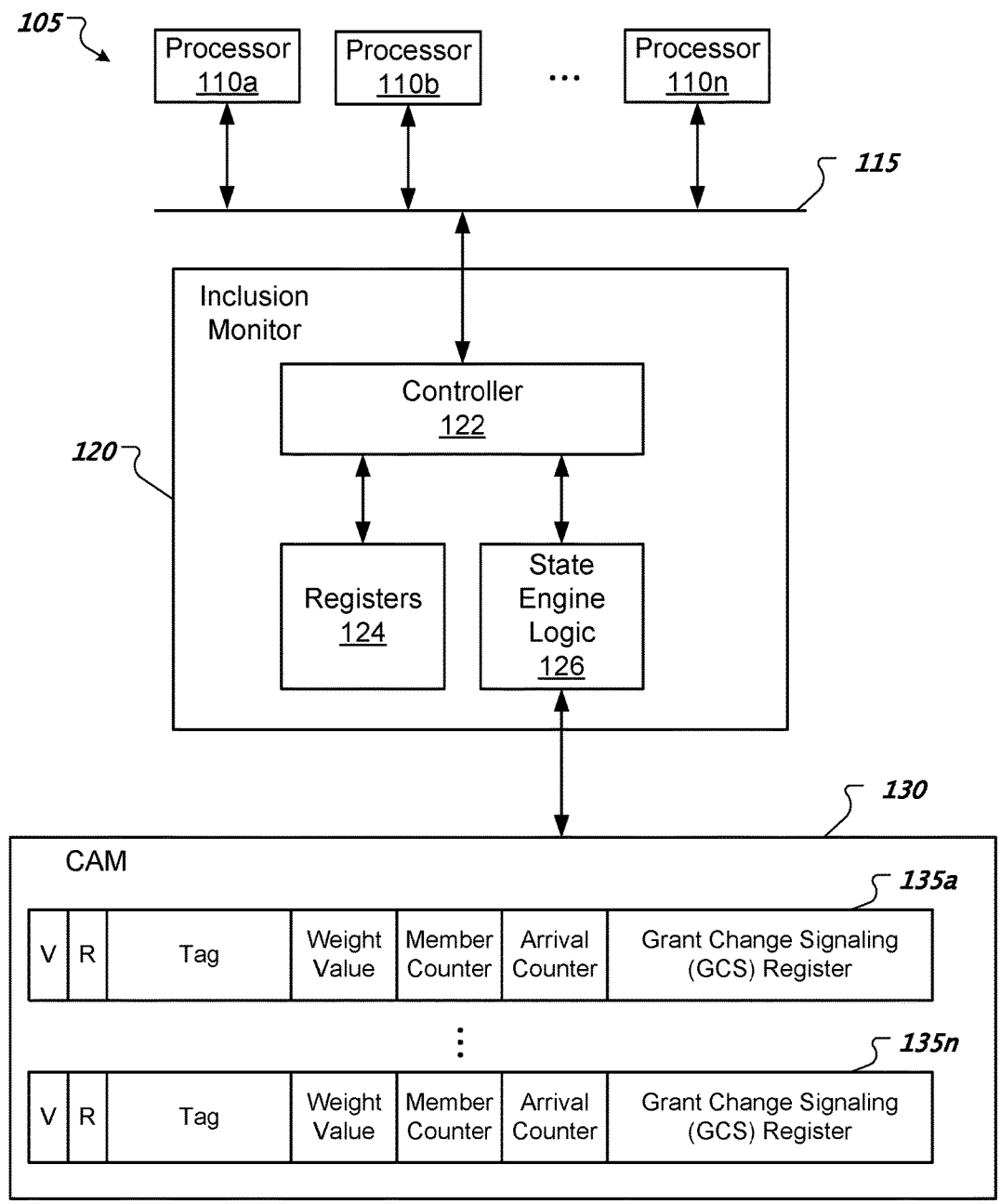
FIG. 1 shows an architecture of an example of a computing system that includes an inclusion monitor.

FIG. 1 shows an architecture of an example of a computing system 105 that includes an inclusion monitor 120. The computing system 105 includes multiple processors 110a-n. The processors 110a-n can be referred to as cores or processing engines. The processors 110a-n are coupled with circuitry called an inclusion monitor 120 via a network 115. In some implementations, the network 115 includes a bus. In some implementations, the network 115 includes a switch. The inclusion monitor 120 utilizes a CAM 130 for naming barriers. The inclusion monitor 120 can support the inversion of an inclusion protocol to effect a controlled access gate which allows one or more processors 110a-n to pass through at a turnstile gate up to a configurable upper limit, e.g., a weight.

An application executing on the computing system 105 can employee one or more differently named barriers to synchronize one or more groups of tasks. The application can use one or more inclusion tags to respectively refer to one or more specific barriers. A tag can be a predetermined binary value. The processors 110a-n can execute inclusion instructions including an acquire inclusion instruction and a release inclusion instruction to perform barrier based synchronization. Based on an execution of an acquire or a release instruction, a corresponding acquire or release request is transmitted to the inclusion monitor 120. The instructions and the requests can include an identifier tag to specify the appropriate inclusion tag to the inclusion monitor. Further, the acquire instruction and request can include a tag and a weight value that specifies the number of worker processors that are required to issue a release request using the same tag before any of the worker processors are released.

The inclusion monitor 120, in some implementations, is an addressable hardware component of the system 105 that utilizes one or more control sequences to manage inclusion tags within the CAM 130. The inclusion monitor 120 is capable of managing multiple inclusion tags at any given time. The inclusion monitor 120 can include a controller 122, registers 124, and state engine logic 126. The controller 122 can communicate with the processors 110a-n via network 115. In some implementations, the controller 122 uses a packet-based protocol to communicate with the processors 110a-n.

Based on receiving an acquire or release request via controller 122, the state engine logic 126 can perform a lookup in the CAM 130 using a tag included in the request. Further, the state engine logic 126 can create, modify, or invalidate an entry 135a-n within the CAM 130 based on the request. In some implementations, the state engine logic 126 can include a state engine for each initiator of a named barrier. A monitor initiator can be a processor 110a-n or a proxy. A proxy can represent a group of processors or a group of subordinate proxies. The registers 124 can store information to manage initiator signaling. For example, the registers 124 can store information to manage scenarios where the CAM 130 is full and a new named barrier cannot be created; such information can be used to notify the initiator when space becomes available within the CAM 130. In some implementations, the state engine logic 126 includes digital circuitry such as logic gates, e.g., AND gate, OR gate, or exclusive OR (XOR) gates, arranged to perform one or more operations as described herein. In some implementations, the inclusion monitor 120 includes the CAM 130.

The CAM 130 is arranged to store multiple CAM entries 135a-n. The depth of the CAM 130, e.g., the number of CAM entries, is the maximum number of differently named barriers that can be stored by the CAM 130. In this example, each CAM entry 135a-n includes a valid flag (labelled V), a release flag (labelled R), and a tag. Upon creation, the valid flag is set to indicate that the corresponding entry 135a-n is valid. As used herein, the notation V==T indicates that a CAM entry is valid, whereas V==F indicates that the CAM entry is not valid. The release flag, when asserted, indicates that the corresponding CAM entry was added by a release request in anticipation of a future acquire request with the same inclusion tag. The notation R==T indicates that the release flag of the CAM entry is TRUE, e.g., asserted, whereas R==F indicates that the release flag is FALSE, e.g., not asserted. In some implementations, the release flag is not changeable after creating the entry, e.g., if R is set to "T" then it will remain as "T" until the entry is invalidated. In some implementations, the state engine logic 126 can perform a lookup responsive to an acquire or release request by searching each CAM entry 135a-n until a tag of an entry that matches the request's tag is located.

Further, each CAM entry 135a-n can include a weight value, a member counter, an arrival counter, or a combination thereof. The entry's weight value, when set by an acquire inclusion request, can specify the required number of processors 110a-n to arrive at the barrier via a release inclusion request before any of the processors 110a-n are permitted to pass the barrier. The arrival counter can be incremented based on an arrival of a release request. In general, if the arrival counter matches the weight value, the processors 110a-n that have sent a release request are permitted to pass the barrier. The member counter can be incremented based on arrival of an acquire request.

In addition, each CAM entry 135a-n can include one or more registers such as a grant change signaling (GCS) register. One or more records, e.g., processor identifiers, within the GCS register can indicate if a specific processor 110a-n is waiting for a corresponding (e.g., same named) acquire or release request to arrive at the inclusion monitor 120. One or more records within the GCS register can indicate if a specific processor 110a-n is waiting for a corresponding release request to arrive at the inclusion monitor 120. In some implementations, a register can include a bitmap where different bit positions within the bitmap correspond to different ones of the processors 110a-n, e.g., if the n-th bit position is set to one, then the n-th processor of the processors 110a-n is waiting.

Upon execution of an inclusion instruction by a processor 110a-n, a corresponding request is sent to the inclusion monitor 120. Transmission of a release request to the inclusion monitor 120 causes a lookup of the request's identifier tag in the CAM 130. The lookup can result in either a miss (e.g., no matching tag in the CAM 130) or a hit (e.g., there is a matching tag in the CAM 130). A miss causes a CAM entry 135a-n to be created within the CAM 130 where the request's identifier tag is used as the tag of the CAM entry 135a-n and the R flag is asserted such that R==T and the CAM entry's arrival counter is set to one. The miss can cause a reject to flow back to the initiating processor 110a-n. The initiating processor 110a-n can be enabled for CAM release change signaling from the inclusion monitor 120 by adding the processor's corresponding identifier to the GCS register for that tag within the CAM 130. For example, when a barrier's threshold criterion is satisfied, all processors listed in the entry's GCS register can be notified, e.g., issued a grant, such that they can proceed past the barrier.

Transmission of an acquire inclusion request to the inclusion monitor 120 causes a lookup of the request's identifier tag in the CAM 130. The lookup can result in either a miss (e.g., no matching tag in the CAM 130) or a hit (e.g., there is a matching tag in the CAM 130). In some implementations, a miss causes the request's identifier tag to be added to the CAM 130 and a grant response to flow back to the initiating processor 110a-n. In some implementations, a hit (where R==T due to a release request arriving before the acquire request) causes the matching CAM entry 135a-n data tag to be modified such that R==F and a grant to flow back to the initiating processor 110a-n. Moreover, the acquire request's weight value is used to set the matching CAM entry's 135a-n weight value. The inclusion monitor 120 can perform a check to determine whether the entry's arrival counter equals the entry's weight value. If equal, the inclusion monitor 120 sends a grant to any of the processors 110a-n that are listed in the entry's GCS register.

In some implementations, the processors 110a-n, inclusion monitor 120, and CAM 130 are formed within a system-on-a-chip (SoC). In some implementations, the computing system 105 includes multiple inclusion monitors. In some implementations, the processors 110a-n are arranged in two or more clusters, where each cluster includes an inclusion monitor. Details about clusters, among other things, are provided in U.S. patent application Ser. No. 15/157,982, filed May 18, 2016, and entitled "CONTENT ADDRESSABLE MEMORY (CAM) IMPLEMENTED TUPLE SPACES," which is incorporated herein by reference in its entirety.

Figure 2:
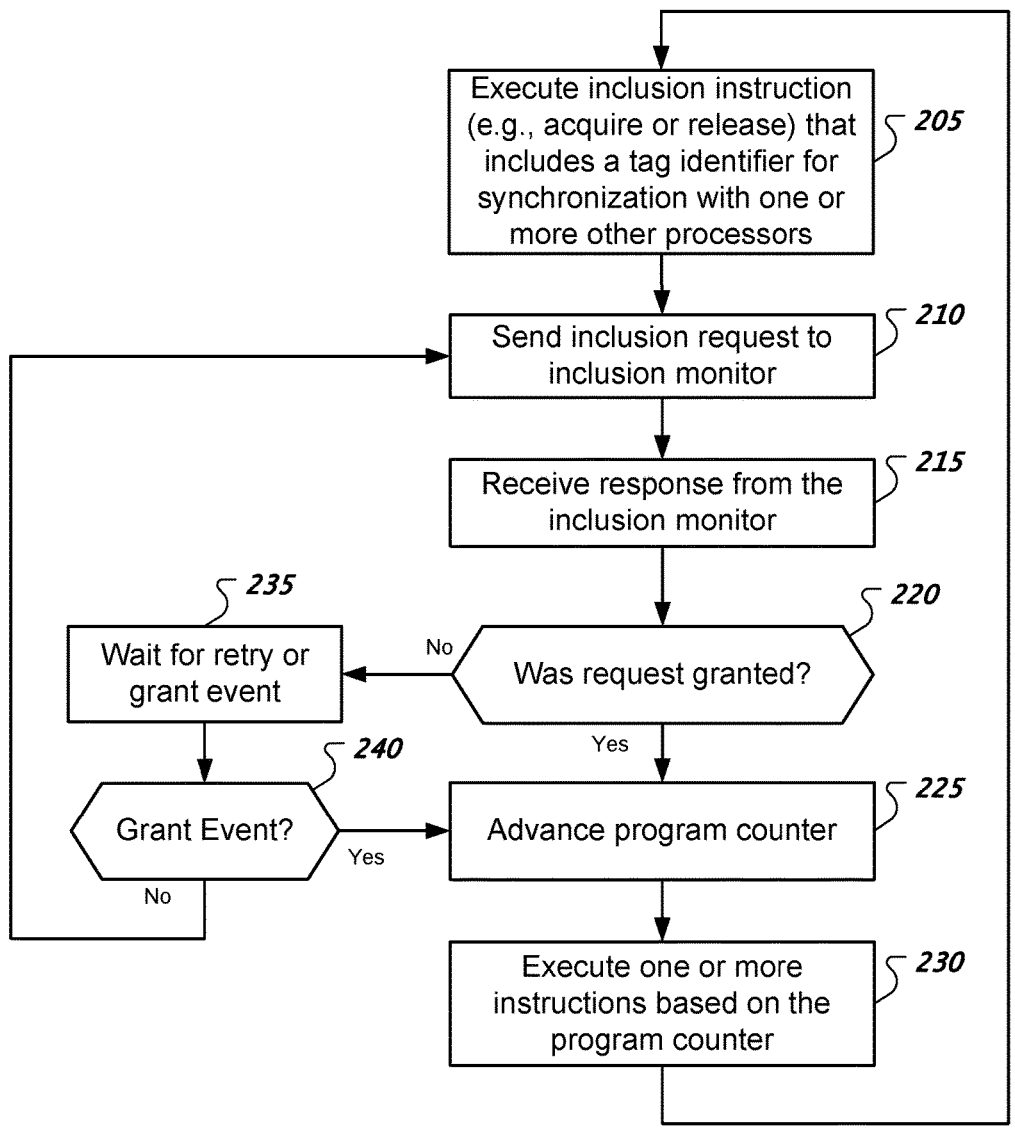
FIG. 2 shows a flowchart of an example of a processor process that is associated with executing a release or acquire inclusion instruction.

FIG. 2 shows a flowchart of an example of a processor process that is associated with executing a release or acquire instruction. A processor, e.g., processor 110a-n of FIG. 1, can execute a group of instructions, the instructions can include one or more inclusion instructions. At 205, the processor executes an inclusion instruction (e.g., acquire or release) that includes a tag identifier for synchronization with one or more other processors. In some implementations, a computing system includes multiple separately addressable inclusion monitors, and an inclusion instruction includes an address corresponding to a specific inclusion monitor within the system. In some implementations, the tag is a binary value that is predetermined.

At 210, the processor sends an inclusion request to an inclusion monitor based on the inclusion instruction. Sending an inclusion request can include transmitting a packet to an inclusion monitor via a network. The inclusion monitor, in some implementations, can perform operations depicted by FIG. 3 if the request is a release request. The inclusion monitor, in some implementations, can perform operations depicted by FIG. 4 if the request is an acquire request.

At 215, the processor receives a response from the inclusion monitor. The response can include a status flag indicating whether the request was granted or rejected. At 220, the processor determines whether the request was granted. If the request was granted at 220, the processor advances the program counter at 225. At 230, the processor executes one or more instructions based on the program counter. As depicted, the processor can execute another inclusion request instruction at 205. In some implementations, the processor can exit the loop based on one or more exit criteria, e.g., after a predetermined number of iterations, failure event, etc.

If the request was not granted at 220, the processor waits for a retry or grant event at 235. In some implementations, the processor can wait to receive a retry command or a grant from the inclusion monitor. In some implementations, the processor is in a low power state while waiting for the retry command or grant. At 240, the processor determines whether the event was a grant event. If the event was not a grant event, e.g., processor received a retry command, the processor sends another inclusion request at 210. Otherwise, based on receiving a grant from the inclusion monitor, the processor advances the program counter at 225 and proceeds as depicted by FIG. 2.

After receiving an inclusion request, e.g., acquire or release, the inclusion monitor can selectively create an entry in a CAM. Creating the CAM entry can include using the request's identifier tag as a tag of the CAM entry. Creating the CAM entry can include initializing one or more CAM entry fields such as a weight value, arrival counter, or member counter. While the CAM entry is valid, the inclusion monitor can maintain a count of release requests that correspond to the identifier tag by using the CAM entry's arrival counter. Based on receiving an acquire inclusion request, the inclusion monitor can store the weight value of the acquire inclusion request as the weight value of the CAM entry. If a release request is received before an acquire request, the entry's weight value is initially set to zero.

The inclusion monitor can cause processors that have sent a release request on a particular tag to enter a stalled state based on a determination that the arrival counter of the correspond CAM entry does not satisfy a threshold criterion specified by a weight value of the CAM entry or a determination that the acquire request has not yet been received by the inclusion monitor. In some implementations, the determination that the entry's arrival counter does not satisfy the threshold criterion specified by the entry's weight value can include a first determination that the entry's weight value is greater than zero, and if greater, a second determination that the entry's arrival counter is less than the entry's weight value. The inclusion monitor can track the stalled processors by using a register of the CAM entry. For example, the inclusion monitor can record the identifiers of such processors in the entry's register. The stalled processors can be released from the stalled state based on a determination that the entry's arrival counter satisfies the threshold criterion specified by the entry's weight value, e.g., the arrival counter equals the weight value. After releasing the stalled processors or triggering the release, the inclusion monitor can invalidate the CAM entry.

Figure 3:
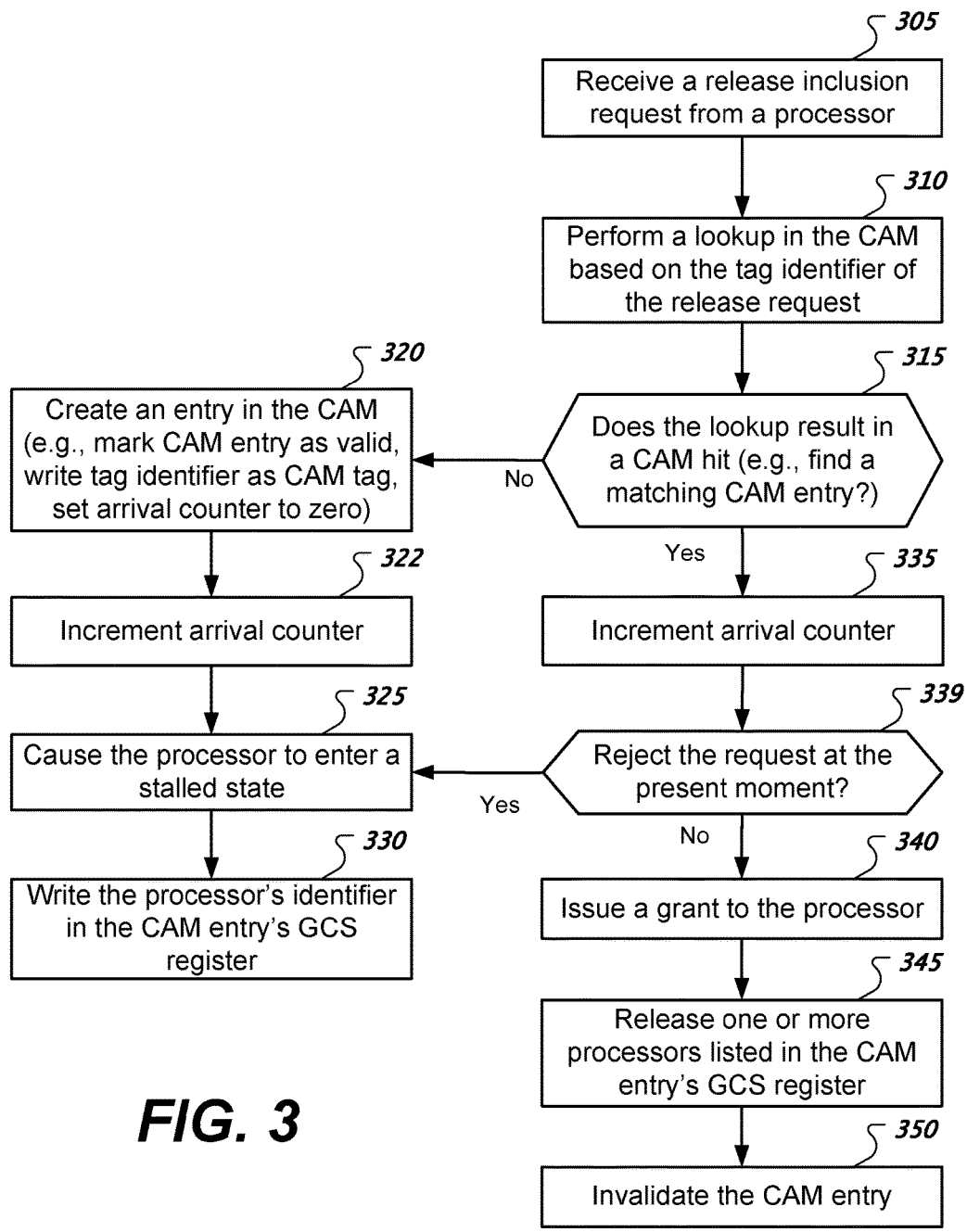
FIG. 3 shows a flowchart of an example of an inclusion monitor process that is associated with receiving a release inclusion request.

FIG. 3 shows a flowchart of an example of an inclusion monitor process that is associated with receiving a release inclusion request. At 305, the inclusion monitor receives a release inclusion request from a processor. At 310, the inclusion monitor performs a lookup in the CAM based on the tag identifier of the release request. In some implementations, the lookup is performed sequentially until a matching entry is found. In some implementations, the lookup is performed in parallel, e.g., all CAM entries are compared to the request's tag at the same time. At 315, the inclusion monitor determines if the lookup resulted in a CAM hit. In some implementations, a CAM is configured to compare the tag identifier with one or more CAM entries until a matching CAM entry is found. In some implementations, the CAM is configured to return an index number corresponding to the matching CAM entry or return an error status if a matching entry is not found.

If the lookup did not result in a CAM hit, e.g., resulted in a CAM miss, then the inclusion monitor creates an entry in the CAM at 320. Creating a CAM entry at 320 can include retrieving an index number corresponding to an available, e.g., invalid, entry in the CAM, writing the tag identifier as the CAM tag in the CAM entry, marking the CAM entry as valid, setting the member counter to zero, setting the weight to zero, and setting the arrival counter to zero. Since a release request was responsible for creating the CAM entry, the inclusion monitor can mark the CAM entry as a release entry, e.g., setting the entry's release flag to TRUE. At 322, the inclusion monitor increments the arrival counter in the CAM entry. In some implementations, to creating an entry can include setting the arrival counter to one to avoid the increment at 322. At 325, the inclusion monitor causes the processor to enter a stalled state. Causing the processor to enter a stalled state can include sending a reject command to the processor. In some implementations, a stalled state causes the processor to sleep such that a program counter associated with the processor does not advance. At 330, the inclusion monitor writes a processor identifier of the processor in a GCS register of the CAM entry. Writing a processor identifier of the processor can include setting a bit within the register at a particular bit position corresponding to the specific processor.

Otherwise, if the inclusion monitor determines that the lookup resulted in a CAM hit at 315, then the inclusion monitor, at 335, increments the CAM entry's arrival counter. At 339, the processor determines whether to reject the request at the present moment. In some implementations, the request is rejected if either the entry's arrival counter is less than the entry's member counter or the arrival counter is less than a non-zero weight value, whereas the request is granted if the arrival counter is equal to the member counter or if the arrival counter equals a non-zero weight value. In some implementations, determining whether to reject the request at the present moment includes computing a Q value: $Q = (W == 0) ? (AC == MC) : (AC == W)$, where AC is arrival counter, MC is member counter, and W is weight. Note that Q obtains its truth value from either (AC==MC) or (AC==W), but not both. The request is rejected if Q is false, whereas the request is granted if Q is true. If the request is rejected at 339, then the inclusion monitor causes the processor to enter a stalled state at 325 and writes the processor's identifier in a GCS register of the CAM entry at 330.

If the request is not rejected at 339 (e.g., if the arrival counter is equal to the member counter or if the arrival counter equals a non-zero weight value), the inclusion monitor issues a grant to the processor at 340. At 345, the inclusion monitor releases one or more processors listed in the CAM entry's GCS register. Releasing a processor can include sending a grant command. The grant command can be addressed based on the processor identifier stored in the GCS register. At 350, the inclusion monitor invalidates the CAM entry. Invalidating the CAM entry can include setting the entry's valid flag to FALSE.

Figure 4A:
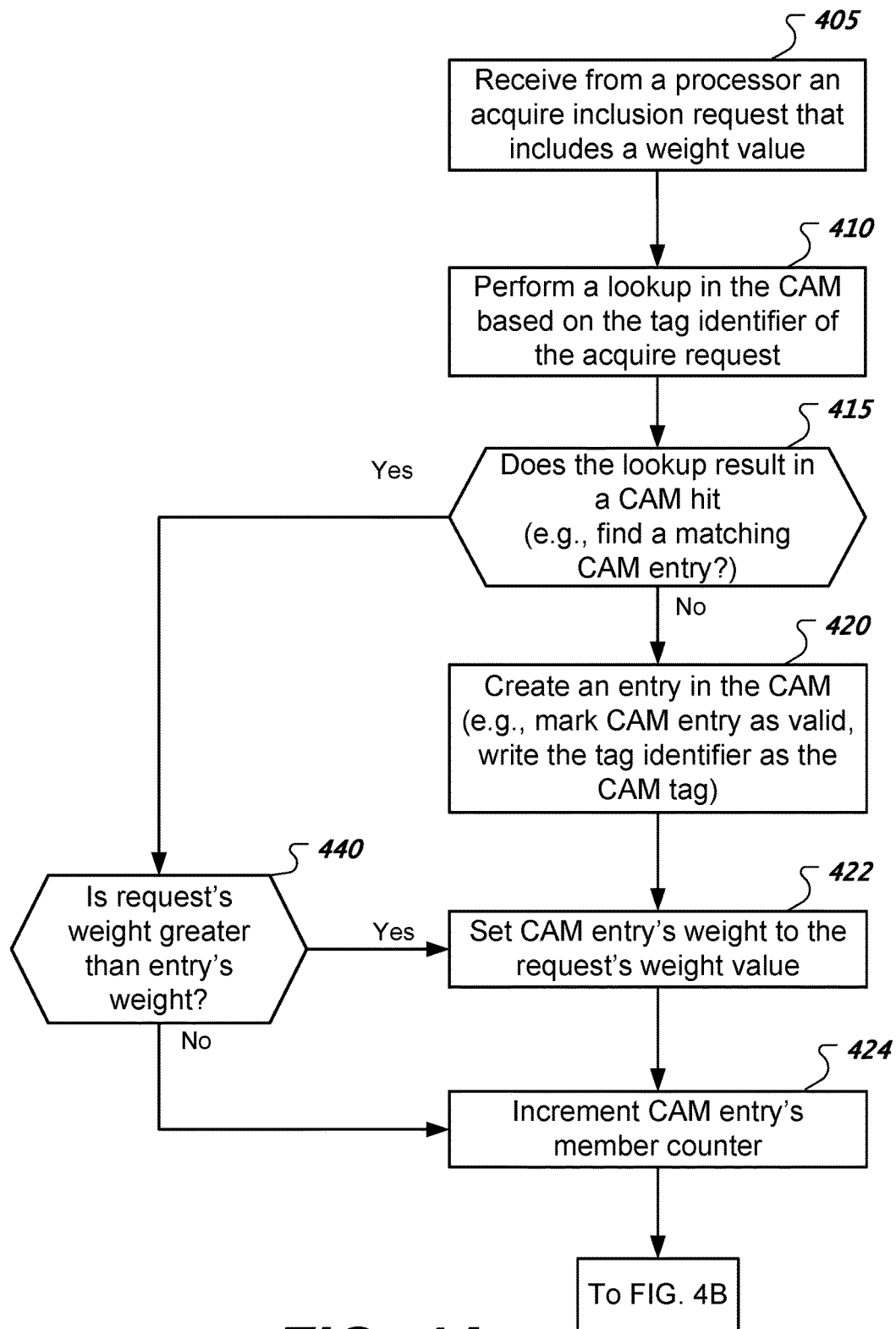
FIGS. 4A and 4B show a flowchart of an example of an inclusion monitor process that is associated with receiving an acquire inclusion request.
Figure 4B:
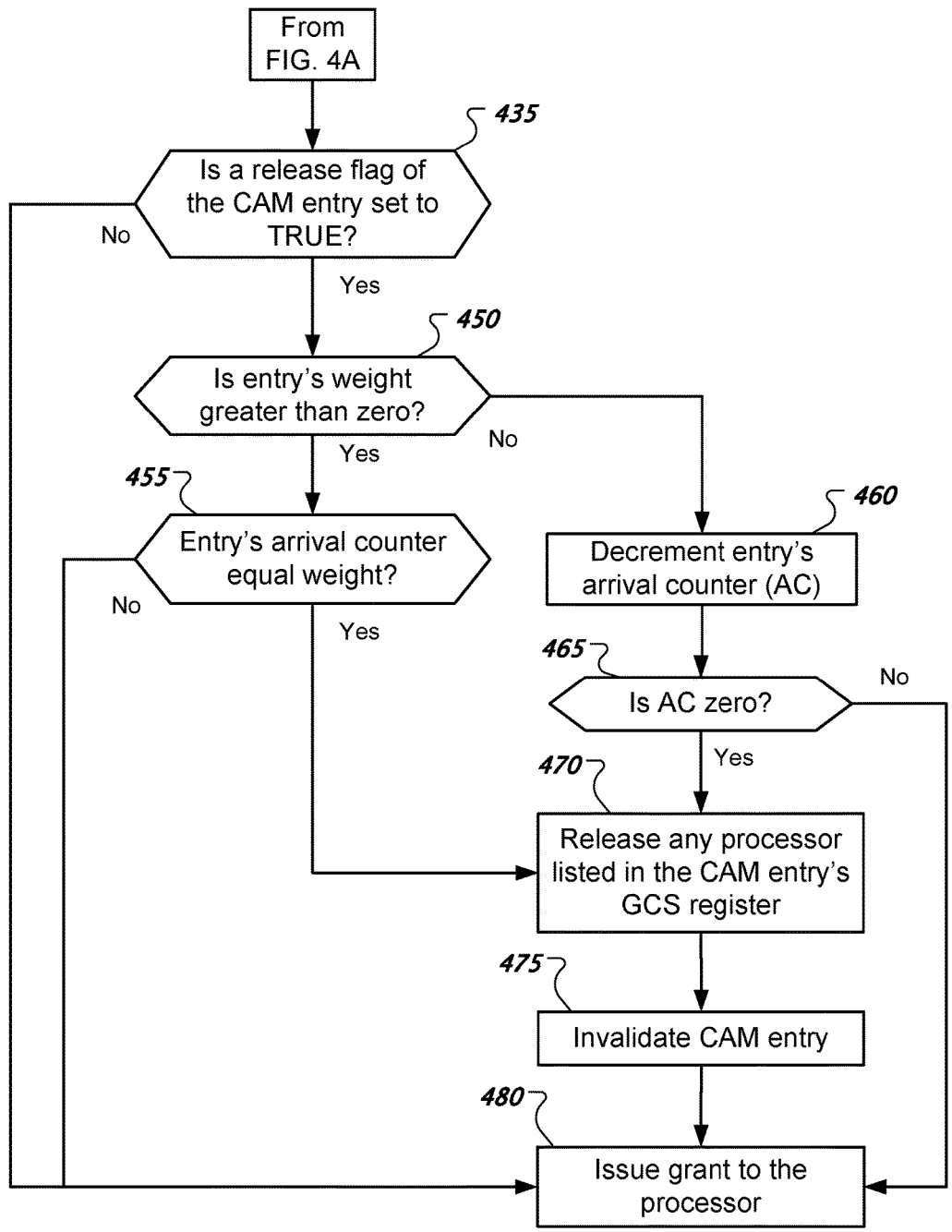

FIGS. 4A and 4B show a flowchart of an example of an inclusion monitor process that is associated with receiving an acquire inclusion request. At 405, the inclusion monitor receives an acquire inclusion request from a processor. At 410, the inclusion monitor performs a lookup in the CAM based on the tag identifier of the acquire request. At 415, the inclusion monitor determines if the lookup resulted in a CAM hit. In some implementations, a CAM is configured to compare the tag identifier with one or more CAM entries until a matching CAM entry is found. In some implementations, the CAM is configured to return an index number corresponding to the matching CAM entry or return an error status if a matching entry is not found.

If the lookup did not result in a CAM hit, e.g., it is a CAM miss, at 415, then the inclusion monitor creates an entry in the CAM at 420. Creating an entry at 420 can include retrieving an index number corresponding to an available, e.g., invalid, entry in the CAM, writing the tag identifier of the acquire request as the CAM tag in the CAM entry, marking the CAM entry as valid, setting the arrival counter to zero, and setting the release flag to FALSE. At 422, the inclusion monitor sets the CAM entry's weight to the request's weight value. At 424, the inclusion monitor increments the CAM entry's member counter. After 424, the flowchart continues in FIG. 4B.

If, at 415, the inclusion monitor determined that the lookup resulted in a CAM hit, the inclusion monitor determines whether the acquire request's weight is greater than the CAM entry's weight at 440. If greater, the inclusion monitor continues at 422, which is above-described. If not greater, the inclusion monitor continues at 424, which is also above-described, and then continues in FIG. 4B.

In FIG. 4B, the inclusion monitor, at 435, determines whether a release flag of the CAM entry is set to TRUE. If the release flag is set to FALSE, then the inclusion monitor continues at 480. If the release flag is set to TRUE at 415, then the inclusion monitor determines whether the entry's weight is greater than zero at 450. If the entry's weight is greater than zero at 450, then the inclusion monitor determines whether the entry's arrival counter equals entry's weight value at 455. If the entry's arrival counter does equal the entry's weight value, then the inclusion monitor continues at 470. If the entry's arrival counter does not equal the entry's weight value, then the inclusion monitor continues at 480.

If the entry's weight is equal to zero at 450, then the inclusion monitor decrements the entry's arrival counter at 460. At 465, the inclusion monitor determines whether the arrival counter is zero. If not zero at 465, the inclusion monitor issues a grant to the processor at 480. If the arrival counter is zero at 465, the inclusion monitor releases and removes any processor listed in a GCS register of the CAM entry at 470. Releasing a processor can include sending a grant command. The command can be addressed based on the processor identifier stored in a GCS register of the CAM entry. At 475, the inclusion monitor invalidates the CAM entry. At 480, the inclusion monitor issues a grant to the processor. In some implementations, the grant is issued at or before the removal of the CAM entry.

Figure 5:
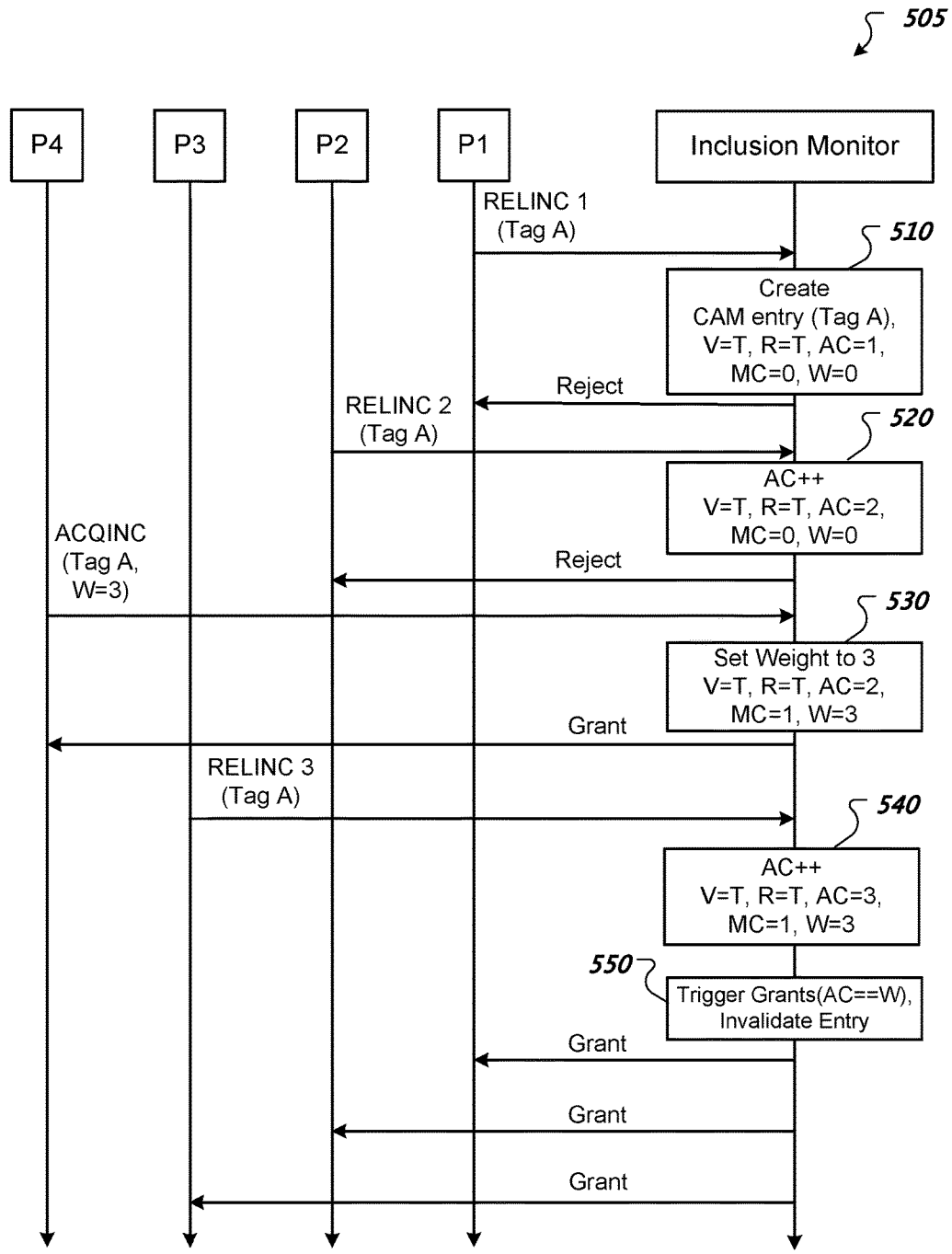
FIG. 5 shows a sequence of an example exchange of communications among processors and an inclusion monitor within a computing system.

FIG. 5 shows a sequence 505 of an example exchange of communications among processors and an inclusion monitor within a computing system. In this example, four processors (labelled P1, P2, P3, and P4) engage in a barrier synchronization operation. Here, processors P1, P2, and P3 are slave processors and send release inclusion requests (labelled RELINC) to the inclusion monitor. Processor P4 is the master processor and sends an acquire inclusion request (labelled ACQINC) to the inclusion monitor. The processors P1-P4 include the same tag (Tag A) in their respective requests. Note that the master processor could also be a slave processor in the sense that it sends a release in addition to the acquire.

In the sequence 505, processor P1 sends a release inclusion request (#1) referencing tag A to the inclusion monitor. The inclusion monitor performs a lookup in its CAM based on tag A. Based on the lookup failing (e.g., all entries are initially invalid), the inclusion monitor creates an entry with tag A in the CAM (510). The CAM entry's valid flag is set to TRUE (V=T), release flag is set to TRUE (R=T), arrival counter is set to one (AC=1), member counter is set to zero (MC=0), and weight value is set to zero (W=0). Since an acquire request has not been received, the inclusion monitor sends a reject response to processor P1. The reject response can cause processor P1 to stall. Further, the inclusion monitor can make a record in the CAM entry's GCS register denoting the identity of processor P1.

Processor P2 sends a release inclusion request (#2) that identifies tag A to the inclusion monitor. Since the CAM entry with tag A has already been created, the lookup performed by the inclusion monitor responsive to the release request (#2) will be successful. The CAM entry's arrival counter is incremented by one (520). The inclusion monitor sends a reject response to processor P2. Further, the inclusion monitor can make a record in the CAM entry's GCS register denoting the identity of processor P2.

Processor P4 sends an acquire inclusion request that identifies tag A to the inclusion monitor. The acquire inclusion request includes a weight value of 3. Since the CAM entry with tag A has already been created, the lookup performed by the inclusion monitor responsive to the acquire inclusion request will be successful. The inclusion monitor accesses the weight value from the request and uses this value to set the CAM entry's weight value and increment member counter (530). The inclusion monitor sends a grant response to processor P4.

Processor P3 sends a release inclusion request (#3) that identifies tag A to the inclusion monitor. Since the CAM entry with tag A has already been created, the lookup performed by the inclusion monitor responsive to the release request (#3) will be successful. The CAM entry's arrival counter is incremented by one (540). In some implementations, the inclusion monitor can make a record in the CAM entry's GCS register denoting the identity of processor P3. The inclusion monitor compares the CAM entry's weight value to the CAM entry's arrival counter. Since the weight value is three and three processors have sent a release inclusion request, the arrival counter now equals the weight value and the inclusion monitor triggers grant signals to processors P1-P3 and invalidates the CAM entry (550). In some implementations, the inclusion monitor sends a reject to processor P3 as depicted, however in some other implementations, the inclusion monitor need not send a reject to processor P3 since the monitor will be sending a grant.

Figure 6:
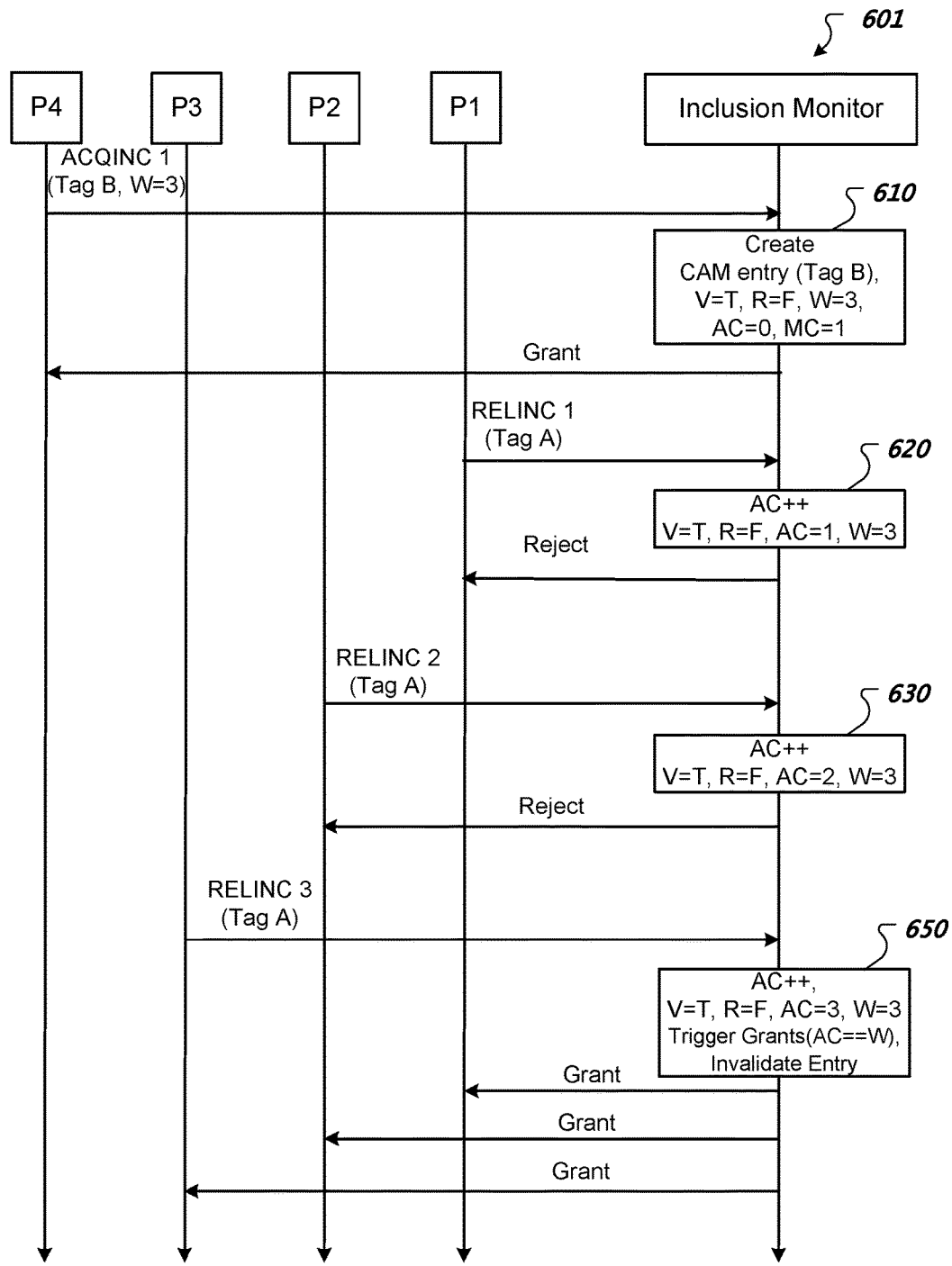
FIG. 6 shows a sequence of another example exchange of communications among processors and an inclusion monitor within a computing system.

FIG. 6 shows a sequence 601 of an example exchange of communications among processors and an inclusion monitor within a computing system. In this example, four processors (labelled P1, P2, P3, and P4) engage in a barrier synchronization operation. Here, processors P1, P2, and P3 are slave processors and send release inclusion requests (labelled RELINC) to the inclusion monitor. Processor P4 is the master processor and sends acquire inclusion requests (labelled ACQINC 1 and ACQINC 2) to the inclusion monitor. The processors P1-P4 include the same tag (Tag B) in their respective requests since the depicted exchanges involve the same barrier.

In the sequence 601, processor P4 sends an acquire inclusion request (#1) that identifies tag B to the inclusion monitor. The acquire inclusion request includes a weight value of 3. The inclusion monitor performs a lookup in its CAM based on tag B. Based on the lookup failing (e.g., all entries are initially invalid), the inclusion monitor creates an entry with tag A in the CAM (610). The entry is created with the valid (V) bit set to TRUE, the release (R) bit set to FALSE, the weight (W) set to 3 to equal the request's weight value, the member counter to 1, and the arrival counter (AC) to zero. The inclusion monitor sends a grant response to processor P4.

Processor P1 sends a release inclusion request (#1) referencing tag B to the inclusion monitor. Since the CAM entry with tag B has already been created, the lookup performed by the inclusion monitor responsive to the release request (#1) will be successful. The CAM entry's arrival counter is incremented by one (620). Since the incremented arrival counter is less than the weight value, e.g. not every expected process has sent a release, the inclusion monitor sends a reject response to processor P1. The reject response can cause processor P1 to stall. Further, the inclusion monitor can make a record in the CAM entry's GCS register denoting the identity of processor P1.

Processor P2 sends a release inclusion request (#2) referencing tag B to the inclusion monitor. Since the CAM entry with tag B has already been created, the lookup performed by the inclusion monitor responsive to the release request (#2) will be successful. The CAM entry's arrival counter is incremented by one (630). Since the incremented arrival counter is still less than the weight value, the inclusion monitor sends a reject response to processor P2. The reject response can cause processor P1 to stall. Further, the inclusion monitor can make a record in the CAM entry's GCS register denoting the identity of processor P2.

Processor P3 sends a release inclusion request (#3) that identifies tag A to the inclusion monitor. Since the CAM entry with tag A has already been created, the lookup performed by the inclusion monitor responsive to the release request (#3) will be successful. The CAM entry's arrival counter is incremented by one (650). The inclusion monitor compares the CAM entry's weight value to the CAM entry's arrival counter. Since the weight value is three and three processors have sent a release inclusion request, the arrival counter now equals the weight value and the inclusion monitor triggers grant signals to processors P1-P3 and invalidates the CAM entry (650). In some implementations, the inclusion monitor can make a record in the CAM entry's GCS register denoting the identity of processor P3. After the comparison, the inclusion monitor sends a grant to all processors listed in the GCS register. Further, since processor P4 is also listed in the GCS register due to acquire request (#2), the inclusion monitor sends a retry signal to P4 to cause P4 to resend the acquire request.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. An apparatus comprising:
   inclusion monitor circuitry;
   a content addressable memory (CAM) coupled with the inclusion monitor circuitry;
   a first processor configured to send a first release request to the inclusion monitor circuitry, wherein the first release request comprises an identifier tag;
   a second processor configured to send a second release request to the inclusion monitor circuitry, wherein the second release request comprises the identifier tag; and
   a third processor configured to send an acquire request to the inclusion monitor circuitry, wherein the acquire request comprises the identifier tag and a weight value,
   wherein the inclusion monitor circuitry is configured to create a CAM entry in the CAM based on receiving the first release request, the second release request, or the acquire request, and use the identifier tag as a tag of the CAM entry,
   wherein the inclusion monitor circuitry, in response to receiving the first release request, is configured to perform a first lookup in the CAM based on the identifier tag of the first release request, increment an arrival counter of the CAM entry, and cause the first processor to enter a stalled state based on (i) a first determination that the arrival counter of the CAM entry does not satisfy a threshold criterion specified by a weight value of the CAM entry or (ii) a first determination that the acquire request has not yet been received by the inclusion monitor circuitry, and
   wherein the inclusion monitor circuitry, in response to receiving the second release request, is configured to perform a second lookup in the CAM based on the identifier tag of the second release request, increment the arrival counter of the CAM entry, and cause the second processor to enter the stalled state based on (i) a second determination that the arrival counter of the CAM entry does not satisfy the threshold criterion specified by the weight value of the CAM entry or (ii) a second determination that the acquire request has not yet been received by the inclusion monitor circuitry, and
   wherein the inclusion monitor circuitry, in response to receiving the acquire request, is configured to perform a third lookup in the CAM based on the identifier tag of the acquire request, store the weight value of the acquire request as the weight value of the CAM entry, and release the first processor and the second processor from the stalled state based on a determination that the arrival counter of the CAM entry does satisfy the threshold criterion.

2. The apparatus of claim 1, wherein the inclusion monitor circuitry is configured to invalidate the CAM entry based on the determination that the arrival counter of the CAM entry does satisfy the threshold criterion.

3. The apparatus of claim 2, wherein the third processor is configured to send an additional acquire request to the inclusion monitor circuitry, the additional acquire request comprising the identifier tag, and wherein the inclusion monitor circuitry is configured to perform an additional lookup in the CAM based on a receipt of the additional acquire request and create a new CAM entry in the CAM based on the additional lookup missing in the CAM.

4. The apparatus of claim 1, wherein the first determination that the arrival counter of the CAM entry does not satisfy the threshold criterion specified by the weight value of the CAM entry comprises (i) a determination that the weight value of the CAM entry is greater than zero, and (ii) a determination that the arrival counter is less than the weight value of the CAM entry.

5. The apparatus of claim 1, wherein the inclusion monitor circuitry is configured to store a processor identifier of the first processor in a register of the CAM entry, wherein the inclusion monitor circuitry is configured to release the first processor from the stalled state by sending a command to the first processor, wherein the command is addressed based on the processor identifier stored in the register in the CAM entry.

6. The apparatus of claim 1, wherein the inclusion monitor circuitry, the CAM, and the processors are formed within a system-on-a-chip.

7. The apparatus of claim 1, wherein the first processor comprises the third processor.

8. A method comprising:
sending, from a first processor, a first release request to inclusion monitor circuitry, wherein the first release request comprises an identifier tag;
sending, from a second processor, a second release request to the inclusion monitor circuitry, wherein the second release request comprises the identifier tag;
sending, from a third processor, an acquire request to the inclusion monitor circuitry, wherein the acquire request comprises a weight value and the identifier tag;
creating, in a content addressable memory (CAM) by the inclusion monitor circuitry, a CAM entry based on a receipt of the first release request, the second release request, or the acquire request, wherein creating the CAM entry comprises using the identifier tag as a tag of the CAM entry;
incrementing, in response to receiving the first release request, an arrival counter of the CAM entry;
causing the first processor to enter a stalled state based on (i) a first determination that the arrival counter of the CAM entry does not satisfy a threshold criterion specified by a weight value of the CAM entry or (ii) a first determination that the acquire request has not yet been received by the inclusion monitor circuitry;
incrementing, in response to receiving the second release request, the arrival counter of the CAM entry;
causing the second processor to enter the stalled state based on (i) a second determination that the arrival counter of the CAM entry does not satisfy the threshold criterion specified by the weight value of the CAM entry or (ii) a second determination that the acquire request has not yet been received by the inclusion monitor circuitry;
storing, in response to receiving the acquire request, the weight value of the acquire request as the weight value of the CAM entry; and
releasing the first processor and the second processor from the stalled state based on a determination that the arrival counter of the CAM entry does satisfy the threshold criterion.

9. The method of claim 8, comprising:
operating the inclusion monitor circuitry to invalidate the CAM entry based on the determination that the arrival counter of the CAM entry does satisfy the threshold criterion.

10. The method of claim 9, comprising:
operating the third processor to send an additional acquire request to the inclusion monitor circuitry, the additional acquire request comprising the identifier tag;
performing an additional lookup in the CAM based on a receipt of the additional acquire request by the inclusion monitor circuitry; and
creating a new CAM entry in the CAM based on the additional lookup missing in the CAM.

11. The method of claim 8, wherein the first determination that the arrival counter of the CAM entry does not satisfy the threshold criterion specified by the weight value of the CAM entry comprises (i) a determination that the weight value of the CAM entry is greater than zero, and (ii) a determination that the arrival counter is less than the weight value of the CAM entry.

12. The method of claim 8, comprising:
storing a processor identifier of the first processor in a register of the CAM entry,
wherein the releasing comprises sending a command to the first processor, and wherein the command is addressed based on the processor identifier stored in the register.

13. The method of claim 8, wherein the first processor comprises the third processor.

14. A system comprising:
inclusion monitor circuitry comprising a controller and a content addressable memory (CAM) configured to store a plurality of CAM entries; and
processors to perform synchronization via the inclusion monitor circuitry using an identifier tag, wherein first processors of the processors are configured to respectively send release requests to the controller, the release requests comprising the identifier tag, wherein a second processor of the processors is configured to send an acquire request to the controller, the acquire request comprising a weight value and the identifier tag,
wherein the controller is configured to mark a CAM entry of the CAM entries as valid based on receiving at least one of the release requests or the acquire request, and write the identifier tag of the at least one of the release requests or the acquire request as a tag of the CAM entry,
wherein the controller is configured to perform first lookups in the CAM based on the identifier tag of the release requests, maintain a count of the release requests that correspond to the identifier tag by using an arrival counter of the CAM entry, and cause the first processors to enter a stalled state based on a determination that the arrival counter of the CAM entry does not satisfy a threshold criterion specified by a weight value of the CAM entry or a determination that the acquire request has not yet been received by the controller, and
wherein the controller is configured to perform a second lookup in the CAM based on the identifier tag of the acquire request, store the weight value of the acquire request as the weight value of the CAM entry, and release the first processors from the stalled state based on a determination that the arrival counter of the CAM entry does satisfy the threshold criterion.

15. The system of claim 14, wherein the determination that the arrival counter of the CAM entry does not satisfy the threshold criterion specified by the weight value of the CAM entry comprises (i) a determination that the weight value of the CAM entry is greater than zero, and (ii) a determination that the arrival counter is less than the weight value of the CAM entry.

16. The system of claim 14, wherein the controller is configured to invalidate the CAM entry based on the determination that the arrival counter of the CAM entry does satisfy the threshold criterion.

17. The system of claim 16, wherein the second processor is configured to send an additional acquire request to the controller, the additional acquire request comprising the identifier tag, and wherein the controller is configured to perform an additional lookup in the CAM based on a receipt of the additional acquire request and create a new CAM entry in the CAM based on the additional lookup missing in the CAM.

18. The system of claim 14, wherein the controller is configured to store processor identifiers of the first processors in a register of the CAM entry, and wherein the controller is configured to release the first processors from the stalled state by sending commands to the first processors, wherein the commands are addressed based on the processor identifiers stored in the register in the CAM entry.

19. The system of claim 14, wherein the first processors comprise the second processor.

20. The system of claim 14, wherein the inclusion monitor circuitry and the processors are formed within a system-on-a-chip.

\* \* \* \* \*